United States Patent
Sanchez, Jr.

(10) Patent No.: US 6,658,756 B1
(45) Date of Patent: Dec. 9, 2003

(54) MAGNETIC TAPE AND STORAGE MEANS

(76) Inventor: Cruz Adam Sanchez, Jr., 1802 N. Wheeler St., Victoria, TX (US) 77901

( * ) Notice: Subject to any disclaimer, the term of this patent is extended or adjusted under 35 U.S.C. 154(b) by 3 days.

(21) Appl. No.: 09/791,328

(22) Filed: Feb. 23, 2001

(51) Int. Cl.[7] .............................. G01B 3/10; A47F 7/00
(52) U.S. Cl. ........................... 33/770; 33/760; 211/70.6
(58) Field of Search ...................... 33/770, 758, 760, 33/761, 768, 769, 755, DIG. 1, 759, 412, 529, 347; 269/8, 16; 211/70.6, 68, 67, 63, 87.01; 224/183, 270, 162, 543, 684

(56) References Cited

U.S. PATENT DOCUMENTS

| | | | |
|---|---|---|---|
| 2,028,694 A | * | 1/1936 | Spinks .................... 211/65 |
| 2,776,448 A | * | 1/1957 | Trammell, Jr. ............... 16/202 |
| 3,036,791 A | | 5/1962 | Siggelkow |
| 3,269,550 A | * | 8/1966 | Marcus .................... 211/70.6 |
| 3,499,225 A | * | 3/1970 | Darrah .................... 33/347 |
| 4,200,984 A | * | 5/1980 | Fink .................... 33/427 |
| D259,226 S | * | 5/1981 | Lester .................... D6/526 |
| 4,306,744 A | * | 12/1981 | Krehbiel .................... 292/144 |
| 4,353,167 A | | 10/1982 | Martin |
| 4,924,597 A | | 5/1990 | Tursi |
| 4,967,482 A | * | 11/1990 | Hoover et al. ............... 33/42 |
| 5,025,966 A | | 6/1991 | Potter |
| D331,542 S | | 12/1992 | Jacoff |
| 5,213,240 A | | 5/1993 | Dietz et al. |
| 5,430,952 A | * | 7/1995 | Betts .................... 33/760 |
| 5,735,052 A | * | 4/1998 | Lin .................... 33/27.03 |
| 5,743,416 A | * | 4/1998 | Yemini .................... 211/70.6 |
| 5,809,662 A | * | 9/1998 | Skinner .................... 33/42 |
| 6,047,481 A | * | 4/2000 | Bond .................... 33/758 |
| 6,089,383 A | * | 7/2000 | Heneveld .................... 211/14 |
| 6,098,303 A | * | 8/2000 | Vogel .................... 33/759 |
| 6,108,926 A | * | 8/2000 | Fraser et al. ............... 33/758 |
| 6,216,888 B1 | * | 4/2001 | Chien .................... 211/87.01 |
| 6,253,931 B1 | * | 7/2001 | Starkey .................... 211/65 |
| D462,216 S | * | 9/2002 | Jablonski .................... D6/524 |

* cited by examiner

Primary Examiner—Diego Gutierrez
Assistant Examiner—Amy R. Cohen

(57) ABSTRACT

A magnetic tape and storage means for securely positioning the measuring tape on metal surfaces during measurements. The magnetic tape and storage means includes a measuring tape having a bottom side and back side and further having a clip member attached to the back side for storing the measuring tape, a magnetized member being removably attached to the bottom side of said measuring tape, and a storage member for the measuring tape.

1 Claim, 3 Drawing Sheets

MAGNETIC TAPE AND STORAGE MEANS

BACKGROUND OF THE INVENTION

1. Field of the Invention

The present invention relates to a magnetized measuring tape and the means of storing it and more particularly pertains to a new magnetic tape and storage means for securely positioning the measuring tape on metal surfaces during measurements.

2. Description of the Prior Art

The use of a magnetized measuring tape and the means of storing it is known in the prior art. More specifically, a magnetized measuring tape and the means of storing it heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 3,036,791; U.S. Pat. No. 5,213,240; U.S. Pat. No. 5,025,966; U.S. Pat. No. 4,924,597; U.S. Pat. No. 4,353,167; and U.S. Pat. No. D331,542.

While these devices fulfill their respective, particular objectives and requirements, the aforementioned patents do not disclose a new magnetic tape and storage means. The inventive device includes a measuring tape having a bottom side and back side and further having a clip member attached to the back side for storing the measuring tape, a magnetized member being removably attached to the bottom side of said measuring tape, and a storage member for the measuring tape.

In these respects, the magnetic tape and storage means according to the present invention substantially departs from the conventional concepts and designs of the prior art, and in so doing provides an apparatus primarily developed for the purpose of securely positioning the measuring tape on metal surfaces during measurements.

SUMMARY OF THE INVENTION

In view of the foregoing disadvantages inherent in the known types of a magnetized measuring tape and the means of storing it now present in the prior art, the present invention provides a new magnetic tape and storage means construction wherein the same can be utilized for securely positioning the measuring tape on metal surfaces during measurements.

The general purpose of the present invention, which will be described subsequently in greater detail, is to provide a new magnetic tape and storage means apparatus and method which has many of the advantages of a magnetized measuring tape and the means of storing it mentioned heretofore and many novel features that result in a new magnetic tape and storage means which is not anticipated, rendered obvious, suggested, or even implied by any of the prior art a magnetized measuring tape and the means of storing it, either alone or in any combination thereof.

To attain this, the present invention generally comprises a measuring tape having a bottom side and back side and further having a clip member attached to the back side for storing the measuring tape, a magnetized member being removably attached to the bottom side of said measuring tape, and a storage member for the measuring tape.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new magnetic tape and storage means apparatus and method which has many of the advantages of a magnetized measuring tape and the means of storing it mentioned heretofore and many novel features that result in a new magnetic tape and storage means which is not anticipated, rendered obvious, suggested, or even implied by any of the prior art a magnetized measuring tape and the means of storing it, either alone or in any combination thereof.

It is another object of the present invention to provide a new magnetic tape and storage means which may be easily and efficiently manufactured and marketed.

It is a further object of the present invention to provide a new magnetic tape and storage means which is of a durable and reliable construction.

An even further object of the present invention is to provide a new magnetic tape and storage means which is susceptible of a low cost of manufacture with regard to both materials and labor, and which accordingly is then susceptible of low prices of sale to the consuming public, thereby making such magnetic tape and storage means economically available to the buying public.

Still yet another object of the present invention is to provide a new magnetic tape and storage means which provides in the apparatuses and methods of the prior art some of the advantages thereof, while simultaneously overcoming some of the disadvantages normally associated therewith.

Still another object of the present invention is to provide a new magnetic tape and storage means for securely positioning the measuring tape on metal surfaces during measurements.

Yet another object of the present invention is to provide a new magnetic tape and storage means which includes a measuring tape having a bottom side and back side and further having a clip member attached to the back side for storing the measuring tape, a magnetized member being removably attached to the bottom side of said measuring tape, and a storage member for the measuring tape.

Still yet another object of the present invention is to provide a new magnetic tape and storage means that secures the measuring tape upon a metal surface during the use thereof.

Even still another object of the present invention is to provide a new magnetic tape and storage means that allows a single person to accurately use the measuring tape to mostly measure any distance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
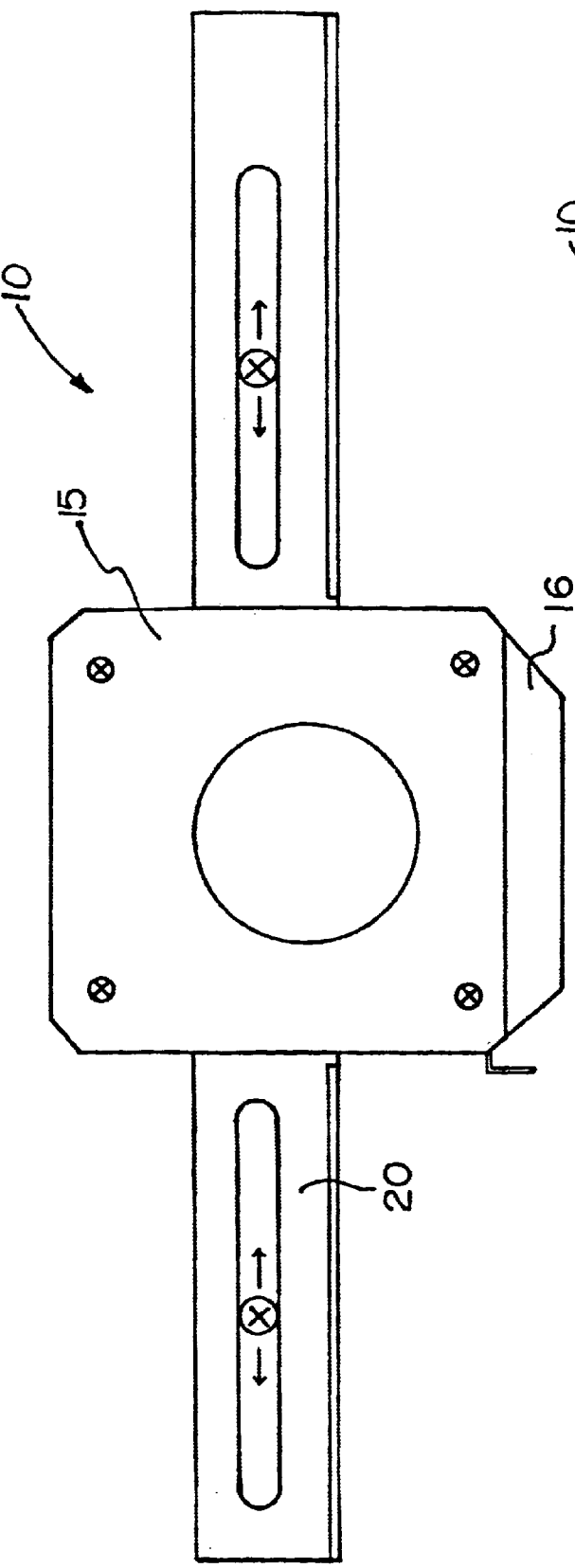
FIG. 1 is a side elevational view of a new magnetic tape and storage means according to the present invention.
Figure 2:
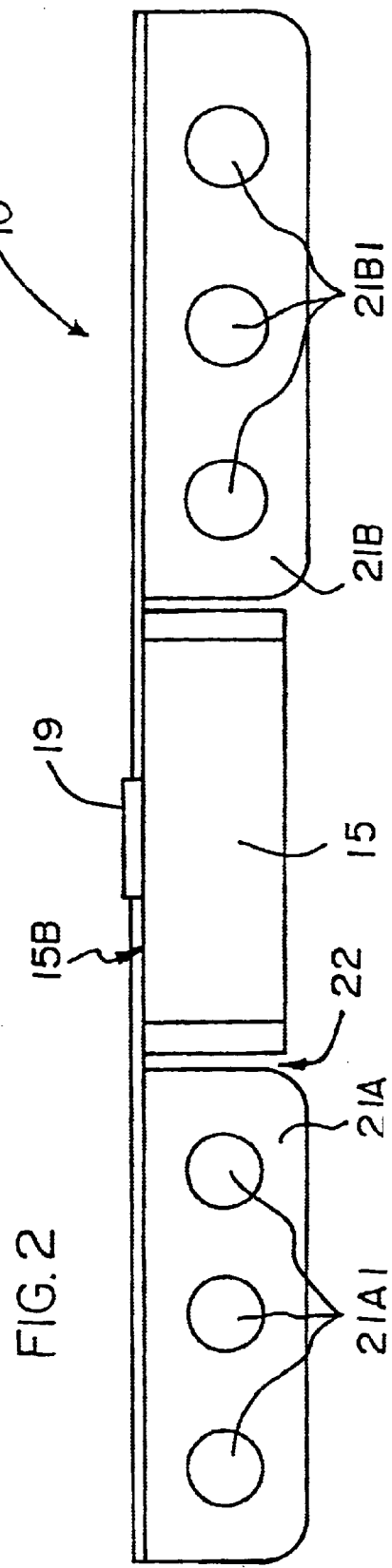
FIG. 2 is a top plan view of the present invention.
Figure 3:
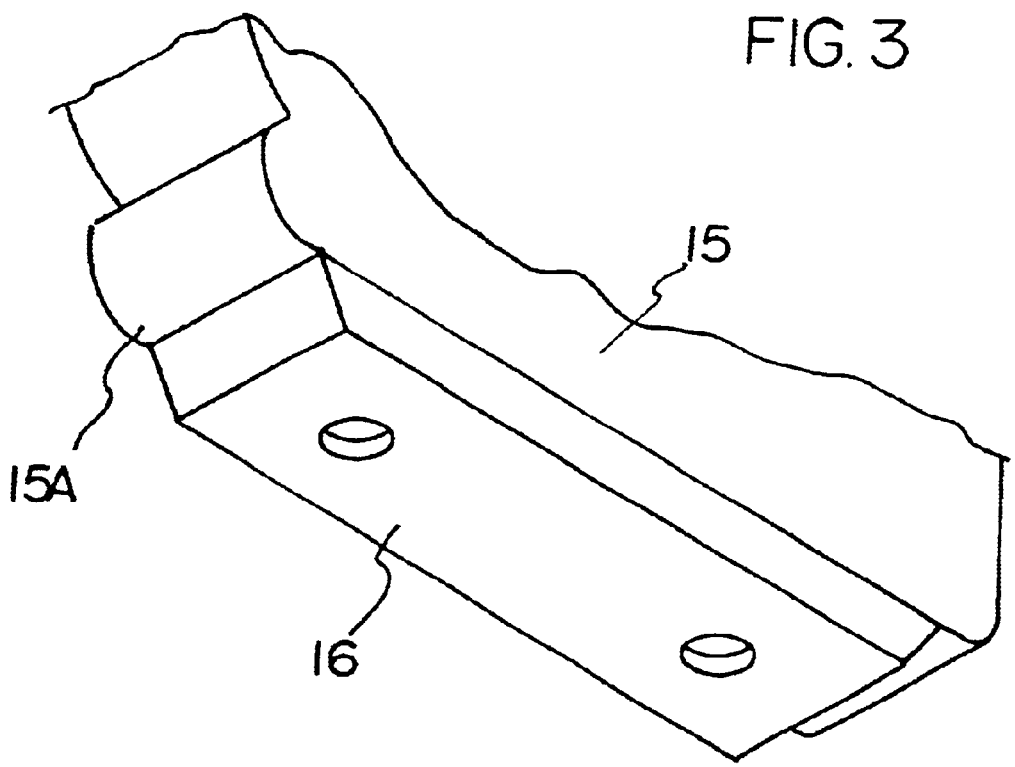
FIG. 3 is a partial perspective view of the measuring tape and the magnetized member of the present invention.
Figure 4:
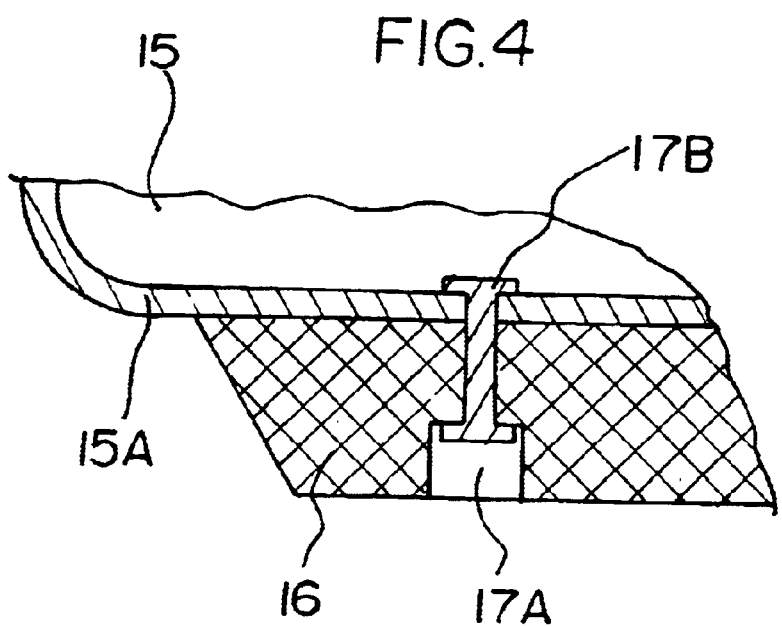
FIG. 4 is a partial side elevational view of another embodiment of the present invention.
Figure 5:
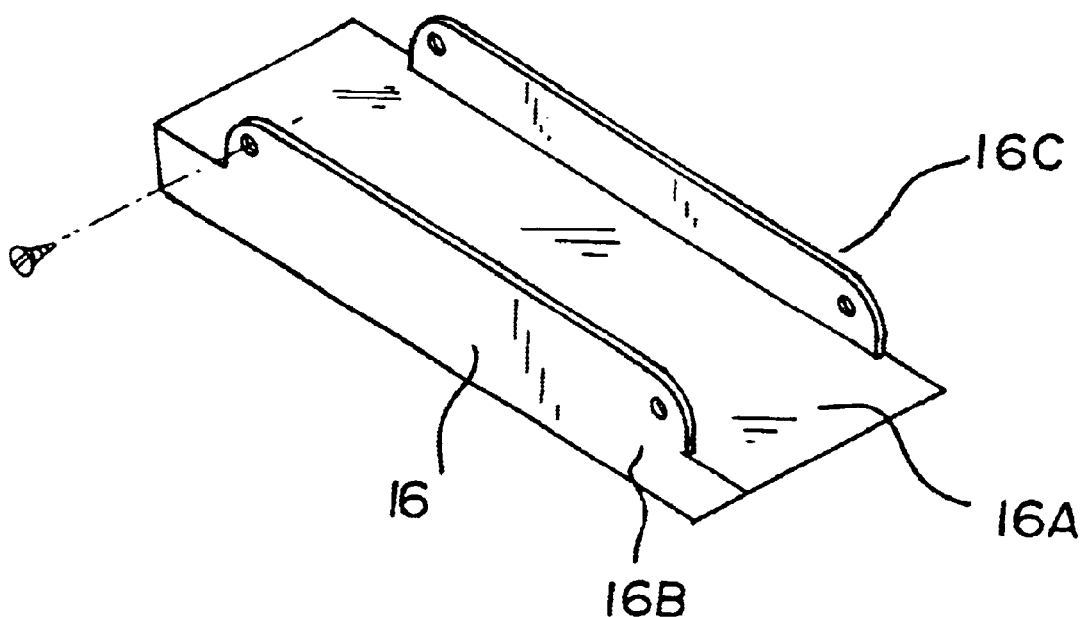
FIG. 5 is a perspective view of another embodiment of the magnetized member of the present invention.
Figure 6:
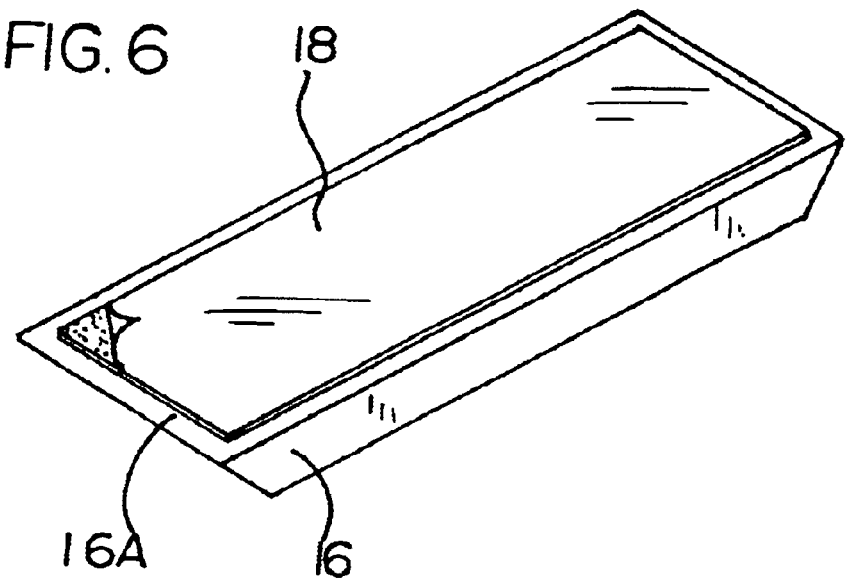
FIG. 6 is a perspective view of another embodiment of the magnetized member of the present invention.

With reference now to the drawings, and in particular to FIGS. 1 through 6 thereof, a new magnetic tape and storage means embodying the principles and concepts of the present invention and generally designated by the reference numeral 10 will be described.

As best illustrated in FIGS. 1 through 6, the magnetic tape and storage means 10 generally comprises a measuring tape having a housing 15 and having a bottom side 15A and back side 1 SB and further having a clip member 19 conventionally attached to the back side 15B for storing the measuring tape. A magnetized member is conventionally and removably attached to the bottom side 15A of the measuring tape and includes a generally rectangular body 16 having a top side 16A and further has ends and longitudinal sides which are generally flush with ends and longitudinal sides of the bottom side 15A of the measuring tape when the body 16 is attached to the measuring tape. The body 16 is approximately 2⅜ inches long, approximately 1¼ inches wide, and approximately ¼ inches thick. A means for storing the measuring tape includes a rack having an elongate member 20 and a pair of support members 21A,21B extending outwardly from the elongate member 20. The support members 21A,21B are spaced apart and disposed near opposite ends of the elongate member 20. Each of the support members 21A,21B has a plurality of holes 21A1,21B1 therethrough, the holes 21A1,21B1 being adapted to receive items such as tools and kitchen utensils. The space 22 disposed between the support members 21A,21B is adapted to receive the measuring tape which can be supported upon the elongate member 20.

As a first embodiment, the magnetized member has a strip 18 of adhesive attached to the top side 16A. As a second embodiment, the magnetized member includes a generally rectangular body 16 having a top side 16A and further having longitudinal sides 16B, 16C each having an upper portion which extends above the top side 16A of the body 16 and which have holes therethrough for fastening to sides of the measuring tape with the body 16 having ends which are generally flush with ends of the measuring tape. As a third embodiment, the magnetized member is fastened with conventional fasteners to the bottom side of the measuring tape. As a fourth embodiment, the magnetized member has slots 17A therein, the slot 17A being dimensioned to receive moveable clips 17B which are used to clip the magnetized member to the bottom side 15A of the measuring tape.

In use, the user would place the measuring tape on a metal surface with magnetized member being in contact with the surface, and the user could extend the tape without also having to hold the measuring tape unit and can comfortably make the measurements necessary.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A magnetic measuring tape and storage means comprising:

a measuring tape having a front side, a back side, a pair of end sides, and a bottom side, said measuring tape having a clip member for storing said measuring tape, said clip member being mounted to said back side of said measuring tape;

a magnetized member for magnetically coupling said measuring tape to a ferromagnetic surface, said magnetized member being mounted to and extending away from said bottom side of said measuring tape, said magnetized member including a generally rectangular body having an attachment surface being oriented substantially parallel to said bottom side of said measuring tape, said magnetized member having ends and longitudinal sides being generally flush with ends and longitudinal sides of said bottom side of said measuring tape, each of said ends of said magnetized member being angled outward from said attachment surface to a juncture of each of said end sides and said bottom side of said measuring tape to facilitate releasing said magnetized member from the ferromagnetic surface to which it is attached by reducing the amount of contact between said magnetized member and the ferromagnetic surface when said measuring tape is rotated upon either of said ends of said magnetized member;

a means for storing said measuring tape consisting of an elongate rack member, said rack member comprising a plate having an inner side and an outer side, said rack member having a middle portion and a pair of outer portions extending outwardly from said middle portion along a longitudinal axis of said rack member, each of said outer portions including a support member attached to a bottom edge of said outer portion and extending away from said outer side of said rack member in a substantially perpendicular manner such that each of said outer portions is L-shaped, each of said support members having a plurality of holes extending therethrough for receiving and storing items such as tools and kitchen utensils;

wherein a distance between said support members defines a space that has a width that is generally greater than a distance between said end sides of said measuring tape such that said measuring tape is positionable in said space; and wherein said measuring tape is releasably attachable to said rack member when positioned in said space between said support members and said clip member is positioned over said middle portion of said rack member.

\* \* \* \* \*